United States Patent Office 3,053,845
Patented Sept. 11, 1962

3,053,845
BENZOPYRIDOCOLINES
James R. Tretter, Niantic, Conn., assignor to Chas. Pfizer & Co., Inc., New York, N.Y., a corporation of Delaware
No Drawing. Filed Aug. 29, 1961, Ser. No. 133,760
11 Claims. (Cl. 260—287)

This invention relates to new and useful organic ring-nitrogen compounds as well as to their non-toxic acid addition salts. More particularly, it is concerned with certain novel derivatives of various 2-hydroxybenzopyridocolines which have been found to be especially valuable as therapeutic agents.

The compounds which are included within the purview of this invention are selected from the group consisting of benzopyridocoline bases of the formula:

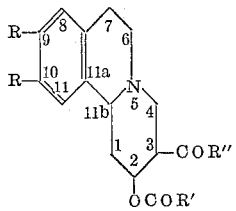

and the pharmaceutically acceptable acid addition salts thereof, wherein R is a member selected from the group consisting of hydrogen, lower alkoxy and alkyl having from one to five carbon atoms, and when both R groups are taken together they form a methylenedioxy group; R' is a member selected from the group consisting of alkoxy having from one to eight carbon atoms, benzyloxy, allyloxy, propargyloxy, alkyl having from one to six carbon atoms, trifluoromethyl, phenyl, p-chlorophenyl, o-methoxyphenyl, p-tolyl, p-anisyl, 3-pyridyl and lower N-monoalkylamino; and R" is a member selected from the group consisting of N,N-diethylamino, N,N-diisopropylamino, N-ethyl-N-isopropylamino, N-(lower alkyl)-N-phenylamino and N-(lower alkyl)-N-(p-tolyl)amino. The Patterson system of nomenclature is the system employed through this specification as is illustrated above by the foregoing general structural formula for a 2-acyloxy - 3 - carboxamido-9,10-disubstituted-1,2,3,4,6,7-hexahydro-11b-H-benzopyridocoline [e.g., see A. M. Patterson et al., The Ring Index, Reinhold Publishing Corp., New York (1940)].

Typical member compounds of this series include such benzopyridocolines as 2-acetoxy-3-(N,N-diethylcarboxamido)-9,10-dimethoxy - 1,2,3,4,6,7 - hexahydro-11b-H-benzopyridocoline ($CH_3COO$ - axial), 2-benzoyloxy-3-(N,N-diethylcarboxamido) - 9,10 - dimethoxy-1,2,3,4,6,7-hexahydro-11b-H-benzopyridocoline ($C_6H_5COO$ - axial), 2-(N-monoethylcarbamyloxy) - 3 - (N,N-diethylcarboxamido)-9,10-dimethoxy - 1,2,3,4,6,7 - hexahydro-11b-H-benzopyridocoline ($C_2H_5NHCOO$ - axial), 2 - ethoxycarboxy - 3 - (N,N-diethylcarboxamido)-9,10-dimethoxy-1,2,3,4,6,7 - hexahydro - 11b - H - benzopyridocoline ($C_2H_5OCOO$-axial), 2 - trifluoroacetoxy-3-(N,N-diethylcarboxamido)-9,10-dimethoxy - 1,2,3,4,6,7 - hexahydro-11b-H-benzopyridocoline ($CF_3COO$-axial), 2-acetoxy-3-(N-ethyl - N - isopropylcarboxamido) - 9,10 - dimethoxy-1,2,3,4,6,7 - hexahydro - 11b - H - benzopyridocoline ($CH_3COO$-axial), and the like. These compounds are all of medicinal value in view of the potent tranquilizing effects which they exhibit, as are the corresponding axial-equatorial mixtures from which they are derived. The corresponding equatorial isomers, on the other hand, only possess these properties to a much lesser degree than do their aforementioned epimers, but they are useful as intermediates for the preparation of the axial-equatorial mixtures via standard equilibration techniques well-known to those having skill in the art to which this type subject matter pertains (e.g., via the use of aluminum isopropoxide in an acetone solvent medium). Moreover, as is already obvious from what has just been discussed, the axial-equatorial mixtures are also additionally useful as intermediates for the preparation of the desired epimers of this series, viz., the axial compounds.

The process employed for the preparation of these compounds will vary, depending upon whether the ester, carbamate or carbonate is the type compound to be obtained. For instance, it is possible to prepare the herein described esters of the 2-hydroxybenzopyridocolines in high yield by contacting a 2-hydroxybenzopyridocoline under substantially anhydrous conditions with an acylating agent selected from the group consisting of an alkane hydrocarbon carboxylic acid anhydride having from two to seven carbon atoms, trifluoroacetic anhydride, benzoic anhydride, p-chlorobenzoic anhydride, o-methoxybenzoic anhydride, p-toluic anhydride, p-anisoic anhydride and nicotinic anhydride in the presence of a tertiary amine base as catalyst (although this is not absolutely necessary) at a temperature that is in the range of from about 20° C. up to about the boiling point of the reaction mixture (which may be as high as 140° C. in some instances) for a period of about one to about thirty hours. The amount of acylating agent employed is such that its molar ratio to the 2-hydroxybenzopyridocoline starting material is substantially equivalent to a value that is in the range of from about 1:1 up to about 5:1 and said tertiary amine is present in such amount that it is substantially equivalent to a value of about 25 to 150% by weight of the acylating agent employed (the tertiary amine may be and often is used as the reaction solvent in this connection by merely employing an excess of same). Although it is quite possible, and even in some instances desirable, to carry out the reaction in the absence of a reaction-inert organic solvent, there may be times when the use of such a solvent is indicated, e.g., when the acylating agent is a solid compound. Suitable solvents in this connection include almost any neutral, inert anhydrous organic solvent, such as acetone, methyl ether ketone, methyl isobutyl ketone, benzene, toluene, xylene, 1,4-dioxane, tetrahydrofuran, methylene chloride, chloroform, ethylene dichloride, tetrachlorethane, methyl acetate, ethyl acetate, isopropyl acetate, methyl propionate, ethyl propionate, diethyl ether, diisopropyl ether, di-n-propyl ether, and the like, as well as lower alkane hydrocarbon carboxylic acids like glacial acetic acid, propionic acid, isobutyric acid, and so on. However, as previously indicated, the reaction is ordinarily conducted in the absence of such a solvent by merely employing an excess of the acylating agent if the latter compound happens to be a liquid. Similarly, the use of an excess of the tertiary amine reagent may also serve to provide a solvent in this particular connection. Preferred tertiary amines for use as solvents and/or as catalytic reagents in this reaction include triethylamine, dimethylaniline, pyridine, picoline, lutidine, collidine, quinoline, and the like.

Alternatively, it is also possible to prepare the aforementioned 2-acyloxy compounds by treating the appropriate 2-hydroxybenzopyridocoline base with an acyl chloride as the acylating agent in place of the corresponding acid anhydrides. This reaction is generally conducted in a neutral, inert organic solvent under anhydrous conditions in the presence of an excess of an appropriate basic agent. In general, the reaction is conducted at a temperature that is in the range of from about 0° C. up to about 100° C. for a period of about one-half to about eight hours, but it is most convenient and economical in practice to conduct the reaction at room temperature. Although any inert organic solvent may be employed as a suitable medium in which to carry out this acylation reaction, it is generally most desirable to employ such solvents as aromatic hydrocarbons, halogenated lower hydrocarbons, lower alkyl ketones, lower alkyl esters of lower alkane hydrocarbon carboxylic acids, lower dialkyl ethers, dioxane and tetrahydrofuran. Preferred aromatic hydrocarbons in this connection include benzene, toluene and xylene; preferred halogenated lower hydrocarbons include methylene chloride, chloroform, ethylene dichloride and s-tetrachlorethane; preferred lower alkyl ketones include acetone, methyl ethyl ketone and methyl isobutyl ketone; preferred lower alkyl esters of lower alkane hydrocarbon carboxylic acids include methyl acetate, ethyl acetate, isopropyl acetate, methyl propionate, ethyl propionate, and so on; while preferred lower dialkyl ethers include diethyl ether, diisopropyl ether, di-n-butyl ether, and the like. Suitable basic agents for use in this process include the alkali metal and alkaline-earth metal oxides, bicarbonates and carbonates, such as magnesium oxide, sodium bicarbonate, sodium carbonate and magnesium carbonate, as well as tertiary amines such as triethylamine, N,N-dimethylaniline and pyridine. Triethylamine in this connection has been found to be the most desirable of all the preferred basic agents because it can easily be removed from the reaction mixture in the form of the solid hydrochloride by-product which it affords.

In accordance with the process employed herein for the preparation of the carbonates such as, for example, the 2-alkoxycarboxybenzopyridocoline compounds, the appropriate 2-hydroxybenzopyridocoline base or acid addition salt thereof is reacted under substantially anhydrous conditions with at least an equimolar quantity of a chlorocarbalkoxy ester having from two to eight carbon atoms at a temperature that is in the range of from about 0° C. up to about 50° C. for from about five to about 35 hours, said reaction being conducted in the presence of a suitable basic agent. Examples of such chlorocarbalkoxy esters include methyl chlorocarbonate, ethyl chlorocarbonate, isopropyl chlorocarbonate, t-butyl chlorocarbonate, n-amyl chlorocarbonate, n-hexyl chlorocarbonate, benzyl chlorocarbonate, allyl chlorocarbonate, propargyl chlorocarbonate, and the like. The inert organic solvent is desirably selected from the class consisting of lower alkyl ketones, lower alkyl nitriles, lower dialkyl ethers, tetrahydrofuran, dioxane, chlorinated lower hydrocarbons; N,N-di(lower alkyl) substituted derivatives of lower alkane hydrocarbon carboxamides, and lower alkyl esters of lower alkane hydrocarbon carboxylic acids; lower alkyl is so defined as to include one to four carbon atoms. Preferred lower alkyl ketones include acetone, methyl ethyl ketone, methyl isobutyl ketone, and the like; preferred lower alkyl nitriles include acetonitriles, propionitrile, and the like; preferred lower dialkyl ethers include diethyl ether, diisopropyl ether, di-n-propyl ether, diisobutyl ether, di-n-butyl ether, and the like; preferred chlorinated lower hydrocarbons include methylene chloride, chloroform, carbon tetrachloride, ethylene dichloride, trichloroethylene, tetrachloroethane, and the like; while preferred N,N-di(lower alkyl) substituted derivatives of lower alkane hydrocarbon carboxamides include dimethylformamide, diethylformamide, dimethylacetamide, diethylacetamide, and the like; and preferred lower alkylesters of lower alkane hydrocarbon carboxylic acids include methyl formate, ethyl formate, methyl acetate, ethyl acetate, isopropyl acetate, n-butyl acetate, methyl propionate, and the like.

In accordance with a specific embodiment of this process, the reaction is preferably conducted under substantially anhydrous conditions and in the presence of a suitable basic agent, as previously indicated. These latter conditions may readily be effected by the use of an inorganic base or a tertiary amine. Preferred inorganic bases include the alkali metal and alkaline earth metal oxides, bicarbonates and carbonates, such as magnesium oxide, sodium bicarbonate and potassium carbonate, while preferred organic tertiary amines include triethylamine, pyridine, picoline, lutidine, collidine, quinoline, N,N-dimethylaniline and N,N-diethylaniline. In general, it should be noted that although substantially equimolar amounts of the 2-hydroxybenzopyridocoline starting material and substituted chlorocarbonate reagent are reacted, it has been found desirable in most instances to employ a slight excess of the chlorocarbonate reagent in order to ensure completion of the reaction. The inert organic solvent used should be present in sufficient volume to dissolve both the reactants and so provide a suitable homogeneous medium in which the reaction can take place. In practice, it is generally most convenient to dissolve separately the reactants in the desired solvent and then to add the chlorocarbonate solution to that of the 2-hydroxybenzopyridocoline base. Recovery of the desired carbonates of this invention is easily carried out by first removing the insoluble inorganic or amine acid addition salt by-product from the reaction mixture, as the case may be, by means of filtration, followed by evaporation of the solvent filtrate to near dryness under reduced pressure or at least, to the point where incipient crystallization of the desired compound takes place.

Finally, the carbamate compounds of this invention, i.e., the lower N-monoalkylcarbamyloxybenzopyridocolines, are prepared by reacting the corresponding 2-hydroxybenzopyridocolines with a lower alkyl isocyanate in accordance with standard organic procedure. More specifically, the reaction is ordinarily carried out at room temperature and preferably for a period of at least sixteen hours, although this is not absolutely necessary as it is possible in many instances to complete the reaction in less than this time (say, for example, from two to five hours). However, it is essential that anhydrous conditions be maintained in order to prevent unwanted by-product formation due to decomposition of the isocyanate and that at least an equimolar amount of said reagent be employed with respect to the 2-hydroxybenzopyridocoline starting material, although an excess is obviously not desired in view of what has just been discusssed. It may also be preferable to conduct the reaction in the presence of a reaction-inert organic solvent in which both the isocyanate and the 2-hydroxybenzopyridocoline starting material are mutually miscible. Preferred solvents in this connection include halogenated hydrocarbons such as methylene chloride, chloroform, carbon tetrachloride, ethylene dichloride, s-tetrachloroethane, and the like, as well as aromatic hydrocarbons like benzene, toluene, xylene, and so forth, in addition to N,N-di(lower alkyl) derivatives of lower alkane hydrocarbon carboxamides like dimethylformamide, dimethylacetamide, diethylformamide, diethylacetamide, etc. Usually, a reaction time of from two to five hours is sufficient in most instances in order to ensure completion of this step, although it may be found most convenient in practice to allow the reaction mixture to stand overnight (about 16 hours) at room temperature. Upon completion of this step, the resulting carbamate solution is treated with dilute acid and then extracted with one of the aforementioned hydrocarbon solvents in order to completely remove any undesired by-products and impurities. The washed solution is then rebasified and again extracted with a hydrocarbon solvent, and the desired product is subsequently recovered from said solvent extract by any number of standard isolation techniques, and preferably by the method which involves evaporation of said solution under reduced pressure and subsequent crystallization of the particular carbamate so isolated.

The starting materials employed to make the esters, carbonates and carbamates of this invention, viz., the 2-hydroxybenzopyridocolines, are for the most part known compounds, which are prepared in accordance with the methods described in the copending patent application of J. G. Lombardino and W. M. McLamore, Serial No. 13,721, field March 9, 1960. However, conversion of the 2-oxobenzopyridocolines to the corresponding 2-hydroxy compounds is preferably accomplished via the use of catalytic hydrogenation with Adams' platinum oxide catalyst in a lower alkanolic solvent medium. The separation of the reduction product so produced in each case into its corresponding OH-axial and OH-equatorial forms is then readily effected by the use of column chromatography on neutral alumina, followed by elution with a suitable choice of solvents. In this connection, non-polar organic solvents like benzene, toluene and xylene usually serve to completely remove the OH-axial isomer from its epimer (the OH-equatorial form), which, in turn, is best removed from the column by the use of more polar type solvent systems such as the chlorinated lower hydrocarbons and mixtures of these with lower alkanols (e.g., chloroform and chloroform-methanol).

The acids which are used to prepare the pharmaceutically acceptable acid addition salts of the aforementioned 2-acyloxybenzopyridocoline amide bases of this invention are those which form non-toxic acid addition salts containing pharmaceutically acceptable anions, such as the hydrochloride, hydrobromide, hydriodide, nitrate, sulfate or bisulfate, phosphate or acid phosphate, acetate, lactate, citrate or acid citrate, tartrate or bitartrate, oxalate, succinate, maleate, gluconate and saccharate salts.

As previously indicated, the compounds of the present invention and particularly the axial isomers are of primary value to therapy as tranquilizing agents, in addition to being useful as sedatives and as hypotensive agents as well. Furthermore, the toxicity of these particular benzopyridocoline amides has been found to be quite low when they are administered to mice in amounts that are sufficient to achieve the desired effects as hereinafter indicated. Moreover, no other harmful pharmacological side effects have been observed to occur as a result of their administration.

In accordance with a method of treatment of the present invention, the herein described tranquilizers can be administered to an agitated subject via the oral or parenteral routes. In general, these compounds are most desirably administered in doses ranging from about 20 mg. up to about 200 mg. per day, although variations will necessarily occur depending upon the weight of the subject being treated and the particular route of administration chosen. However, a dosage level that is in the range of from about 0.28 mg. to about 2.8 mg. per kg. of body weight per day is most desirably employed in order to achieve effective results. Nevertheless, it is to be appreciated that still other variations may also occur in this respect, depending upon the species of animal being treated and its individual response to said medicament, as well as on the particular type of pharmaceutical formulation chosen and the time period and interval at which such administration is carried out. In some instances, dosage levels below the lower limit of the aforesaid range may be more than adequate, while in other cases still larger dosages may be employed without causing any harmful or deleterious side effects provided that such higher dose levels are first divided into several smaller doses that are to be administered throughout the day.

In connection with the use of the benzopyridocoline amide compounds of this invention for the treatment of agitated subjects, it is to be noted that they may be administered either alone or in combination with pharmaceutically acceptable carriers by either of the routes previously indicated, and that such administration can be carried out in both single and multiple dosages. More particularly, the novel compounds of this invention can be administered in a wide variety of different dosage forms, i.e., they may be combined with various pharmaceutically acceptable inert carriers in the form of tablets, capsules, lozenges, troches, hard candies, powders, sprays, aqueous suspensions, injectable solutions, elixirs, syrups, and the like. Such carriers include solid diluents or fillers, sterile aqueous media and various non-toxic organic solvents, etc. Moreover, such oral pharmaceutical compositions can be suitably sweetened and/or flavored by means of various agents of the type commonly employed for just such a purpose. In general, the therapeutically-effective compounds of this invention are present in such dosage forms at concentration levels ranging from about 0.5% to about 90% by weight of the total composition, i.e., in amounts which are sufficient to provide the desired unit dosage previously indicated.

For purposes of oral administration, tablets containing various excipients such as sodium citrate, calcium carbonate and dicalcium phosphate may be employed along with various disintegrants such as starch and preferably potato or tapioca starch alginic acid and certain complex silicates, together with binding agents such as polyvinylpyrrolidone, sucrose, gelatin and acacia. Additionally, lubricating agents such as magnesium stearate, sodium lauryl sulfate and talc are often very useful for tabletting purposes. Solid compositions of a similar type may also be employed as fillers in soft and hard-filled gelatin capsules; preferred materials in this connection also include lactose or milk sugar as well as high molecular weight polyethylene glycols. When aqueous suspensions and/or elixirs are desired for oral administration, the essential active ingredient may be combined with various sweetening or flavoring agents, coloring matter or dyes and, if so desired, emulsifying and/or suspending agents, together with such diluents as water, ethanol, propylene glycol, glycerin and various like combinations thereof.

For purposes of parenteral administration, solutions of these particular benzopyridocoline amide bases in sesame or peanut oil or in aqueous-propylene glycol may be employed, as well as sterile aqueous solutions of the corresponding water-soluble acid addition salts previously enumerated. Such aqueous solutions should be suitably buffered if necessary and the liquid diluent rendered isotonic with sufficient glucose or saline. These particular aqueous solutions are especially suitable for intravenous, intramuscular and subcutaneous injection purposes. In this connection, the sterile aqueous media employed are readily obtained by standard techniques well-known to those in the art. For instance, distilled water is ordinarily used as the liquid diluent and the final preparation is passed through a suitable bacterial filter, such as a sintered-glass filter or a diatomaceous-earth or unglazed porcelain filter. Preferred filters of this type include the Berkefeld, the Chamberland and the asbestos disc-metal Seitz filter, wherein the fluid is sucked through the filter candle into a sterile container with the aid of a suction pump. Needless to say, the necessary steps should be taken throughout the preparation of these injectable solutions to ensure that the final products are obtained in a sterile condition.

This invention is further illustrated by the following examples, which are not to be construed in any way as imposing limitations upon the scope thereof. On the contrary, it is to be clearly understood that resort may be had to various other embodiments, modifications and equivalents thereof which readily suggest themselves to those skilled in the art without departing from the spirit of the present invention and/or the scope of the appended claims.

*Example I*

One hundred grams (0.278 mole) of 2-oxo-3-(N,N-diethylcarboxamido)-9,10-dimethoxy-1,2,3,4,6,7-hexahydro-11b-H-benzopyridocoline was dissolved in 1500 ml. of hot methanol and the resulting solution was allowed to cool to room temperature. After removal of all the dissolved oxygen therein by saturation of the solution with dry nitrogen, 5.0 g. of Adams' platinum oxide catalyst was introduced into the system in one portion while still maintaining same under a nitrogen atmosphere. The reaction flask and its contents were then shaken at room temperature under slightly greater than one atmosphere of hydrogen pressure until the total hydrogen uptake was completed. Dissolved hydrogen gas was then removed from the reaction solution by saturation of same with respect to dry nitrogen, while the platinum black was removed by means of gravity filtration. Concentration of the resulting filtrate under reduced pressure on a steam bath then afforded a nearly quantitative yield of 2-hydroxy-3-(N,N - diethylcarboxamido) - 9,10 - dimethoxy - 1,2,3,4,6,7-hexahydro-11b-H-benzopyridocoline as a yellow crystalline solid (mixture of the axial and equatorial forms).

*Example II*

A chromatographic column (4" x 84") was prepared by packing 13.6 kg. of neutral alumina, activity grade No. 3, in benzene as the mobile phase, into a column of the aforementioned dimensions to give a bed of adsorbent four inches in diameter and 66 inches in length. A solution consisting of 1042 g. (2.88 moles) of 2-hydroxy-3-(N,N - diethylcarboxamido) - 9,10 - dimethoxy - 1,2,3,4,6,7-hexahydro-11b-H-benzopyridocoline (prepared as in Example I) dissolved in 10 liters of benzene was then applied to the column, which was subsequently eluted with benzene and other solvents of increasing polarity. The following fractions were collected:

| Fraction | Solvent System | Volume (liters) | Yield (grams) |
| --- | --- | --- | --- |
| 1 | $C_6H_6$ | 18 | 669.7 |
| 2 | $C_6H_6$ | 26 | 105.3 |
| 3 | $C_6H_6/25\%$ $CHCl_3$ | 30 | 61.6 |
| 4 | $C_6H_6/25\%$ $CHCl_3$ | 10 | 17.5 |
| 5 | $C_6H_6/40\%$ $CHCl_3$ | 12 | 57.6 |
| 6 | $CHCl_3$ | 15 | 26.0 |
| 7 | $CHCl_3/10\%$ $CH_3OH$ | 12 | 23.3 |
| 8 | $CHCl_3/10\%$ $CH_3OH$ | 4 | 45.5 |
| 9 | $CHCl_3/10\%$ $CH_3OH$ | 6 | 9.3 |
| Total Recovery | | | 1,015.8 (97.7%) |

Each of the above chromatographic fractions was then separately recrystallized from benzene-hexane to give the following crops of varying purity with respect to the axial isomer (this was determined by a consideration of the relative intensity of its chromatographic spot with that of the other spots present, using a carbon tetrachloride-diethylamine-formamide papergram system with fluorescence under black light for detection purposes), each crop being identified by a letter designation (A, the first crop; B, the second crop):

| Crop | Yield, g. | M.P. (° C.) | Papergram purity |
| --- | --- | --- | --- |
| 1A | 640.0 | 134.5–137 | excellent. |
| 1B | 19.7 | 124–133 | fair. |
| 2A | 94.2 | 138–139 | excellent. |
| 3A | 54.0 | 136–137.5 | fair to good. |
| 7A | 14.0 | 135–138 | good. |
| 5A | 45.1 | 137–139 | good. |

The purest crops of 2-hydroxy-3-(N,N-diethylcarboxamido) - 9,10 - dimethoxy - 1,2,3,4,6,7 - hexahydro - 11b-H-benzopyridocoline (OH-axial) (as revealed by M.P. determinations and papergram chromatography), viz., 1A and 2A, were combined (734.2 g.), dissolved in one liter of hot benzene, treated with charcoal, filtered hot and the filter cake washed with 300 ml. of hot benzene. The pale yellow filtrate so obtained was then concentrated to a volume of about one liter and diluted while still hot with two liters of hexane. On cooling to room temperature, small white needles of 2-hydroxy-3-(N,N-diethylcarboxamido) - 9,10 - dimethoxy - 1,2,3,4,6,7 - hexahydro - 11b-H-benzopyridocoline (OH-axial) rapidly crystallized from solution. After standing overnight, the product (now in the form of white granular crystals) was collected, washed with 4.5 liters of benzene-hexane (1:2 volume) and then with 1.8 liters of hexane, and subsequently dried in vacuo at 50° C. for 24 hours. The yield of pure product obtained in this manner amounted to 685 g., M.P. 138–140° C.

The corresponding epimer, viz., 2-hydroxy-3-(N,N-diethylcarboxamido) - 9,10 - dimethoxy - 1,2,3,4,6,7 - hexahydro-11b-H-benzopyridocoline (OH-equatorial) was subsequently isolated from the last three fractions listed in the table of this example (the $CHCl_3/10\%$ $CH_3OH$ eluates), viz., 8, 9 and 10, by using techniques similar to those described above for the isolation of the axial compound, i.e., the chloroform-methanol solutions were concentrated under reduced pressure to give a residue that was subsequently recrystallized from a benzene-hexane solvent system until a constant melting point was attained. In this manner, there was obtained a 40 g. yield of 2-hydroxy - 3 - (N,N - diethylcarboxamido) - 9,10 - dimethoxy-1,2,3,4,6,7-hexahydro-11b-H-benzopyridocoline (OH-equatorial), M.P. 130–131.5° C.

*Example III*

The procedures described in the preceding two examples are repeated employing other 2-oxo-3-(N,N-disubstituted carboxamido)-9,10-disubstituted-1,2,3,4,6,7-hexahydro-11b-H-benzopyridocolines as starting materials in place of the previously used 2-oxo-3-(N,N-diethylcarboxamido) - 9,10 - dimethoxy - 1,2,3,4,6,7 - hexahydro - 11b-H-benzopyridocoline. In order to avoid an unnecessary repetition of experimental detail, these starting materials are listed below as follows:

2-oxo-3-(N,N-diethylcarboxamido)-10-methyl-1,2,3,4,6,7-hexahydro-11b-H-benzopyridocoline 2-oxo-3-(N,N-dimethylcarboxamido)-9,10-dimethoxy-1,2,3,4,6,7-hexahydro-11b-H-benzopyridocoline 2-oxo-3-(N,N-diethylcarboxamido)-9,10-di(n-butyl)-1,2,3,4,6,7-hexahydro-11b-H-benzopyridocoline 2-oxo-3-(N,N-diethylcarboxamido)-9,10-di-isoamyl-1,2,3,4,6,7-hexahydro-11b-H-benzopyridocoline 2-oxo-3-(N,N-di-n-butylcarboxamido)-9-ethoxy-10-methoxy-1,2,3,4,6,7-hexahydro-11b-H-benzopyridocoline 2-oxo-3-(N-methyl-N-phenylcarboxamido)-9,10-dimethoxy-1,2,3,4,6,7-hexahydro-11b-H-benzopyridocoline 2-oxo-3-(N-ethyl-N-phenylcarboxamido)-9,10-dimethoxy-1,2,3,4,6,7-hexahydro-11b-H-benzopyridocoline 2-oxo-3-[N-ethyl-N-(p-tolyl)carboxamido]-9,10-dimethoxy-1,2,3,4,6,7-hexahydro-11b-H-benzopyridocoline 2-oxo-3-(N,N-di-n-propylcarboxamido)-9,10-diisopropoxy-1,2,3,4,6,7-hexahydro-11b-H-benzopyridocoline 2-oxo-3-(N-N-diethylcarboxamido)-9,10-methylenedioxy-1,2,3,4,6,7-hexahydro-11b-H-benzopyridocoline 2-oxo-3-(N,N-diethylcarboxamido)-9,10-dimethyl-1,2,3,4,6,7-hexahydro-11b-H-benzopyridocoline 2-oxo-3-(N,N-diethylcarboxamido)-1,2,3,4,6,7-hexahydro-11b-H-benzopyridocoline 2-oxo-3-(N,N-diisopropylcarboxamido)-1,2,3,4,6,7-hexahydro-11b-H-benzopyridocoline 2-oxo-3-(N-ethyl-N-isopropylcarboxamido)-1,2,3,4,6,7-hexahydro-11b-H-benzopyridocoline In each and every case, the corresponding 2-hydroxybenzopyridocoline compounds are obtained in both their axial and equatorial forms, as well as in the form of an epimeric mixture of the same.

*Example IV*

A mixture consisting of two grams of 2-hydroxy-3-(N,N-diethylcarboxamido) - 9,10 - dimethoxy-1,2,3,4,6,7-hexahydro-11b-H-benzopyridocoline (OH-axial) hydrochloride (prepared by treating the base with hydrogen chloride gas in absolute ether) dissolved in 7 ml. of acetic anhydride containing 3 ml. of pyridine was heated at 100° C. for two hours under a nitrogen atmosphere. At the end of this period, a crystalline precipitate had formed and the resultant mixture was subsequently diluted with an equal volume of diethyl ether and filtered. The crystalline hydrochloride salt so obtained, i.e., the solid material collected on the filter funnel, was then converted to the corresponding free base by distribution in 10 ml. of a benzene-aqueous 5% sodium carbonate system. The product recovered from the benzene extracts was then recrystallized from diisopropyl ether to afford 1.46 g. of 2-acetoxy-3-(N,N-diethylcarboxamido)-9,10-dimethoxy-1,2,3,4,6,7-hexahydro - 11b-H-benzopyridocoline ($CH_3COO$-axial), M.P. 130–131.5° C.

*Analysis.*—Calcd. for $C_{22}H_{32}N_2O_5$: C, 65.32; H, 7.97; N, 6.93. Found: C, 65.42; H, 8.11; N, 7.14.

Example V

The procedure described in Example IV was followed except that 4 ml. of propionic anhydride were made to react with 1 g. of 2-hydroxy-3-(N,N-diethylcarboxamido) - 9,10 - methoxy - 1,2,3,4,6,7 - hexahydro-11b-H-benzopyridocoline (OH-axial) hydrochloride in the presence of 1 ml. of pyridine. Also, the heating step was carried out for a period of 28 hours. In this way, the yield of recrystallized product amounted to 550 mg. and proved to be 2 - propionoxy - 3 - (N-N-diethylcarboxamido) - 9,10 - dimethoxy-1,2,3,4,6,7-hexahydro-11b-H-benzopyridocoline ($C_2H_5COO$-axial), M.P. 110–112.5° C.

*Anal.*—Calcd. for $C_{23}H_{34}N_2O_5$: C, 66.00; H, 8.19. Found: C, 65.89; H, 8.17.

Example VI

The procedure described in Example IV was followed except that 10 ml. of isobutyric anhydride were made to react with the 2-hydroxy-3-(N,N-diethylcarboxamido)-1,2,3,4,6,7 - hexahydro - 11b - H-benzopyridocoline (OH-axial) hydrochloride starting material in the presence of 15 ml. of pyridine for a period of six hours. In this way, there was obtained 910 mg. of 2-isobutyroxy-3-(N,N-diethylcarboxamido) - 9,10-dimethoxy-1,2,3,4,6,7-hexahydro-11b-H-benzopyridocoline (i-$C_3H_7$COO-axial), M.P. 127.5–128° C.

*Anal.*—Calcd. for $C_{24}H_{36}N_2O_5$: C, 66.64; H, 8.39; N, 6.48. Found: C, 66.61; H, 8.08; N, 6.61.

Example VII

The procedure described in Example IV was followed except that 5 ml. of trifluoroacetic anhydride and 1 g. of 2-hydroxy-3-(N,N-diethylcarboxamido) -9,10-dimethoxy-11b-H-benzopyridocoline (OH-axial) hydrochloride were refluxed together under a nitrogen atmosphere for a period of one hour only. The excess anhydride was then removed from the reaction mixture by means of evaporation under reduced pressure, and the residue so obtained was subsequently distributed between 10 ml. of a chloroform-aqueous 5% sodium bicarbonate system. Upon evaporation of the chloroform extract and crystallization of the resultant solid residue from ethyl acetate-hexane, there was obtained 600 mg. of 2-trifluoroacetoxy-3-(N,N-diethylcarboxamido) -9,10-dimethoxy-1,2,3,4,6,7-hexahydro - 11b-H-benzopyridocoline ($CF_3COO$-axial), M.P. 160–161.5° C.

*Anal.*—Calcd. for $C_{22}H_{29}F_3N_2O_5$: C, 57.63; H, 6.37. Found: C, 57.70; H, 6.45.

Example VIII

The procedure described in Example IV is repeated employing caproic anhydride as the reagent of choice in lieu of acetic anhydride. In this way, 2-caproyl-3-(N,N-diethylcarboxamido) - 9,10 - dimethoxy-1,2,3,4,6,7-hexahydro-11b-H-benzopyridocoline ($C_5H_{11}COO$-axial) is the product obtained. In like manner, the use of heptanoic anhydride as the acylating agent in this reaction affords the corresponding 2-heptanoate ($C_6H_{13}COO$-axial), while the use of nicotinic anhydride affords the corresponding 2-nicotinate ($C_5H_4NCOO$-axial).

Example IX

A mixture consisting of 1 g. of 2-hydroxy-3-(N,N-diethylcarboxamido) - 9,10 - dimethoxy-1,2,3,4,6,7-hexahydro-11b-H-benzopyridocoline (OH-axial), 1 ml. of benzoyl chloride and 1 ml. of pyridine was heated at 100° C. for 2.2 hours under a nitrogen atmosphere. The dark-colored reaction mixture was then poured into 50 ml. of water, made alkaline to litmus with 10 ml. of 5% sodium carbonate solution and extracted with benzene. The desired product was then isolated from the benzene extracts by means of column chromatography, employing activated alumina (30 g.) as the chromatographic agent. Recrystallization of the isolated product from diisopropyl ether afforded 370 mg. of pure 2-benzoyl-3-(N,N-diethylcarboxamido)-9,10-dimethoxy-1,2,3,4,6,7-hexahydro-11b-H-benzopyridocoline ($C_6H_5COO$-axial), M.P. 116–119° C.

*Anal.*—Calcd. for $C_{27}H_3N_2O_5$: C, 69.50; H, 7.35. Found: C, 69.51; H, 7.26.

Example X

The procedure described in either of the two previous examples is repeated employing other acyl chlorides in lieu of benzoyl chloride. Thus, when p-chlorobenzoyl chloride, o-methoxybenzoyl chloride, p-toluoyl chloride and p-anisoyl chloride are each individually employed as the reagent of the choice in this particular reaction, the corresponding 2-(ring-substituted benzoates) are respectively obtained (as the axial isomers).

Example XI

To a solution consisting of 1 g. of 2-hydroxy-3-(N,N-diethylcarboxamido) - 9,10 - dimethoxy-1,2,3,4,6,7-hexahydro-11b-H-benzopyridocoline (OH-axial) dissolved in 45 ml. of pyridine, there were added 10 ml. of ethyl chloroformate in a dropwise manner at 0° C. with constant agitation being maintained throughout this step. After the addition was complete, the reaction mixture was allowed to stand at room temperature for 3.5 hours and then poured into 200 ml. of water, made alkaline to litmus with 5% aqueous sodium carbonate solution and extracted with chloroform. The residue obtained upon evaporation of the chloroform extracts was then chromatographed on 30 g. of activated alumina as hereinbefore described, and the product isolated in this manner was further purified by means of recrystallization from diisopropyl ether to afford 330 mg. of 2-ethoxycarboxy-3-(N,N-diethylcarboxamido) - 9,10-dimethoxy-1,2,3,4,6,7-hexahydro-11b-H-benzopyridocoline ($C_2H_5OCOO$-axial), M.P. 145–146° C.

*Anal.*—Calcd. for $C_{23}H_{34}N_2O_5$: C, 63.57; H, 7.89; N, 6.45. Found: C, 63.53; H, 7.86; N, 6.43.

Example XII

The procedure described in Example XI is repeated employing other chloroformates in lieu of that used in the aforementioned previous example. Among such reagents used are methyl chloroformate, isopropyl chloroformate, n-amyl chloroformate, 2-ethylhexyl chloroformate, benzyl chloroformate, allyl chloroformate and propargyl chloroformate. In each every case, the corresponding 2-carbonate of 3-(N,N-diethylcarboxamido)-9,10-dimethoxy-1,2,3,4,6,7 - hexahydro-11b-H-benzopyridocoline is the product individually obtained (as the axial isomers).

Example XIII

One gram of 2-hydroxy-3-(N,N-diethylcarboxamido)-9,10-dimethoxy-1,2,3,4,6,7-hexahydro - 11b - H - benzopyridocoline (OH-axial) was dissolved in 8 ml. of ethyl isocyanate, and the resulting solution was allowed to stand at room temperature for 24 hours. At the end of this time, the reaction mixture was diluted with excess 1 N hydrochloric acid, extracted with benzene and the resultant aqueous layer made alkaline to litmus by the addition of 5% aqueous sodium carbonate solution. After extraction of the latter with benzene and subsequent evaporation of the combined benzene extracts, there was obtained a solid residue which after recrystallization from diisopropyl ether afforded 550 mg. of pure 2-(N-monoethylcarbamyloxy) - 3 - (N,N-diethylcarboxamido)-9,10-dimethoxy-1,2,3,4,6,7-hexahydro-11b-H - benzopyridocoline ($C_2H_5NHCOO$-axial), M.P. 94–95° C. (M.P. 135–136.5° C. after thorough drying in vacuo).

*Analysis.*—Calcd. for $C_{23}H_{35}N_3O_5$: C, 63.72; H, 8.14; N, 9.69. Found: C, 63.72; H, 8.14; N, 9.59.

*Example XIV*

The procedure described in Example XIII is repeated employing other reagents in place of ethyl isocyanate. Thus, methyl isocyanate affords the corresponding 2-(N-monomethylcarbamyl) compound, while n-propyl isocyanate affords the corresponding 2-(N-mono-n-propylcarbamyl) compound and n-butyl isocyanate affords the corresponding 2-(N-mono-n-butylcarbamyl) compound (all as the axial isomers).

*Example XV*

The procedures described in all the foregoing examples are again repeated using other 2-hydroxy-3-(N,N-disubstituted carboxamido)-9,10-disubstituted-1,2,3,4,6,7-hexahydro-11b-H-benzopyridocoline (OH-axial) starting materials in place of 2-hydroxy-3-(N,N,-diethylcarboxamido)-9,10-dimethoxy-1,2,3,4,6,7 - hexahydro - 11b-H-benzopyridocoline (OH-axial). In order to avoid unnecessary repetition of experimental detail, these starting materials are listed below as follows:

2-hydroxy-3-(N,N-diethylcarboxamido) - 10 - methyl-1,2,3,4,6,7 - hexahydro - 11b - H-benzopyridocoline (OH-axial)

2-hydroxy-3-(N,N-dimethylcarboxamido) - 9,10 - dimethoxy-1,2,3,4,6,7-hexahydro - 11b - H-benzopyridocoline (OH-axial)

2-hydroxy-3 - (N,N - diethylcarboxamido) - 9,10 - di(n-butyl) - 1,2,3,4,6,7 - hexahydro-11b-H-benzopyridocoline (OH-axial)

2-hydroxy-3-(N,N - diethylcarboxamido) - 9,10 - di-isoamyl-1,2,3,4,6,7 - hexahydro-11b-H-benzopyridocoline (OH-axial)

2-hydroxy-3-(N,N-di-n-butylcarboxamido) - 9-ethoxy-10-methoxy - 1,2,3,4,6,7-hexahydro-11b-H-benzopyridocoline (OH-axial)

2-hydroxy-3-(N-methyl-N-phenylcarboxamido) - 9,10-dimethoxy-1,2,3,4,6,7-hexayhdro - 11b-H-benzopyridocoline (OH-axial)

2-hydroxy-3-(N-ethyl-N-phenylcarboxamido) - 9,10 - dimethoxy - 1,2,3,4,6,7-hexahydro-11b-H-benzopyridocoline (OH-axial)

2-hydroxy-3-[N-ethyl-N-(p - tolyl)carboxamido]-9,10-dimethoxy - 1,2,3,4,6,7-hexahydro-11b-H-benzopyridocoline (OH-axial)

2-hydroxy-3-(N,N-di - n - propylcarboxamido)-9,10-diisoproxy - 1,2,3,4,6,7-hexahydro-11b-H-benzopyridocoline (OH-axial)

2-hydroxy-3-(N,N - diethylcarboxamido) - 9,10-methylenedioxy - 1,2,3,4,6,7-hexahydro-11b-H-benzopyridocoline (OH-axial)

2-hydroxy-3-(N,N-diethylcarboxamido) - 9,10 - dimethyl-1,2,3,4,6,7 - hexahydro-11b-H-benzopyridocoline (OH-axial)

2-hydroxy-3 - (N,N - diethylcarboxamido) - 1,2,3,4,6,7-hexahydro-11b-H-benzopyridocoline (OH-axial)

2-hydroxy - 3 - (N,N-diisopropylcarboxamido)-1,2,3,4,6,7 - hexahydro - 11b-H-benzopyridocoline (OH-axial)

2-hydroxy - 3 - (N-ethyl-N-isopropylcarboxamido)-1,2,3,4,6,7-hexahydro-11b-H-benzopyridocoline (OH-axial)

*Example XVI*

All the procedures described in Examples IV–XV are repeated except that the 2-hydroxybenzopyridocoline starting material employed in each case happens to be an epimeric mixture of the axial and equatorial forms rather than the pure axial isomer itself. Thus, when the product of Example I is subjected to the reaction procedure of Example IV, there is obtained an epimeric mixture of the axial and equatorial forms of 2-acetoxy-3-(N,N-diethylcarboxamido)-9,10-dimethoxy - 1,2,3,4,6,7 - hexahydro-11b-H-benzopyridocoline. In like manner, the use of this particular starting material in any of the other procedures described in Examples V–XIV affords the corresponding derivative as an epimeric mixture of isomers in each case.

Similar results are also obtained when epimeric mixtures of the 2-hydroxybenzopyridocolines listed in Example XV are individually employed as starting materials in these reactions, i.e., the corresponding derivatives are obtained as epimeric mixtures of the axial and equatorial forms.

*Example XVII*

The non-toxic hydrohalide acid addition salts of each of the benzo-pyridocoline bases reported in the previous examples, such as the hydrochloride, hydrobromide and hydriodide salts thereof, are prepared by first dissolving the respective benzopyridocoline amide base in absolute ether followed by introduction of the appropriate hydrogen halide gas into the solution until saturation is complete, whereupon the desired salt precipitates from solution. The crystalline product so obtained is then recrystallized from acetone-ether to yield the pure hydrohalide salt. For instance, when 1.0 g. of 2-acetoxy-3-(N,N-diethylcarboxamido)-9,10 - dimethoxy - 1,2,3,4,6,7-hexahydro-11b-H-benzopyridocoline ($CH_3COO$-axial) is dissolved in anhydrous diethyl ether and dry hydrogen chloride gas is passed into the resulting solution until saturation of same is complete with respect to said gas, there is obtained a crystalline precipitate of 2-acetoxy-3-(N,N-diethylcarboxamido) - 9,10 - dimethoxy-1,2,3,4,6,7-hexahydro-11b-H - benzopyridocoline ($CH_3COO$-axial) hydrochloride.

*Example XVIII*

The nitrate, sulfate or bisulfate, phosphate or acid phosphate, acetate, lactate, citrate or acid citrate, tartrate or bitartrate, oxalate, succinate, maleate, gluconate and saccharate salts of each of the benzopyridocoline bases reported in the previous examples are all prepared by separately dissolving in a suitable amount of ethanol the proper molar amounts of the respective acid and the appropriate benzopyridocoline base and then mixing the two solutions together, followed by the addition of diethyl ether to the resulting reaction mixture in order to effect precipitation of the desired acid addition salt therefrom. For instance, when equimolar amounts of 2-acetoxy-3-(N,N-diethylcarboxamido) - 9,10 - dimethoxy-1,2,3,4,6,7-hexahydro-11b - H - benzopyridocoline ($CH_3COO$-axial) and concentrated sulfuric acid react in accordance with this procedure, the corresponding product obtained is the sulfuric acid addition salt of 2-acetoxy-3-(N,N-diethylcarboxamido)9,10-dimethoxy-1,2,3,4,6,7 - hexahydro-11b-H-benzopyridocoline ($CH_3COO$-axial).

*Example XIX*

A dry solid pharmaceutical composition is prepared by blending the following materials together in the proportions by weight specified below:

| | |
|---|---|
| 2-acetoxy - 3 - (N,N-diethylcarboxamido) - 9,10-dimethoxy-1,2,3,4,6,7 - hexahydro - 11b - H-benzopyridocoline ($CH_3COO$-axial) | 10 |
| Dicalcium phosphate | 45 |
| Potato starch | 20 |
| Lactose | 15 |
| Polyvinylpyrrolidone | 8 |
| Magnesium stearate | 2 |

After the dried composition is thoroughly blended, tablets are punched from the resulting mixture, each tablet being of such size that it contains 40 mg. of the active ingredient.

Example XX

A dry solid pharmaceutical composition is prepared by combining the following materials in the proportions by weight specified below:

| | |
|---|---|
| 2-acetoxy - 3 - (N,N-diethylcarboxamido) - 9,10-dimethoxy-1,2,3,4,6,7-hexahydro-11b - H - benzopyridocoline (CH₃COO-axial) | 30 |
| Polyethylene glycol (average molecular weight, 6000) | 25 |
| Lactose | 30 |
| Calcium carbonate | 15 |

The dried solid mixture so prepared is then thoroughly agitated so as to obtain a powdered product that is completely uniform. Soft elastic and hard-filled gelatin capsules containing this pharmaceutical composition are then subsequently prepared, employing a sufficient quantity of material so as to provide each capsule with 100 mg. of the active ingredient.

Example XXI

An aqueous propylene glycol solution containing 2-acetoxy - 3 - (N,N-diethylcarboxamido)-9,10-dimethoxy-1,2,3,4,6,7 - hexahydro - 11b - H - benzopyridocoline (CH₃COO-axial) is prepared by dissolving the latter compound in propylene glycol-water (1:3 by weight) with the aid of gentle heating. The amount of compound employed is such that the resulting solution contains 5 mg. of the active ingredient per ml. of solution. After cooling to room temperature, it is sterilized by means of filtration through a Seitz filter. The sterile aqueous propylene glycol solution so obtained is suitable for intramuscular administration to animals.

Example XXII

All the procedures described in Examples IV–XV are repeated except that the 2-hydroxybenzopyridocoline starting material employed in each case happens to be the equatorial isomer rather than the axial isomer that was previously used. Thus, when 2-hydroxy-3-(N,N-diethylcarboxamido) - 9,10-dimethoxy-1,2,3,4,6,7 - hexahydro-11b-H-benzopyridocoline (OH-equatorial) is subjected to the reaction procedure of Example IV, the product obtained is 2-acetoxy-3-(N,N-diethylcarboxamido)-9,10-dimethoxy-1,2,3,4,6,7-hexahydro - 11b-H-benzopyridocoline (CH₃COO-equatorial). In like manner, the use of this particular starting material in any of the other procedures described in Examples V–XIV affords the corresponding derivative in the form of the equatorial isomer in each case.

Similar results are also obtained when the equatorial forms of the 2-hydroxybenzopyridocolines listed in Example XV are individually employed as starting materials in these reactions, i.e., the corresponding derivatives are also obtained in the form of the equatorial isomers.

What is claimed is:

1. A compound selected from the group consisting of benzopyridocoline bases of the formula:

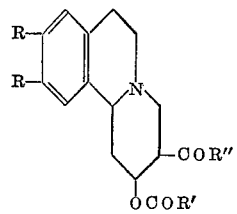

and the pharmaceutically acceptable acid addition salts thereof, wherein R is a member selected from the group consisting of hydrogen, lower alkoxy and alkyl having from one to five carbon atoms, and when both R groups are taken together they form a methylenedioxy group; R' is a member selected from the group consisting of alkoxy having from one to eight carbon atoms, benzyloxy, allyloxy, propargyloxy, alkyl having from one to six carbon atoms, trifluoromethyl, phenyl, p-chlorophenyl, o-methoxyphenyl, p-tolyl, p-anisyl, 3-pyridyl and lower N-monoalkylamino; and R" is a member selected from the group consisting of N,N-diethylamino, N,N-diisopropylamino, N-ethyl-N-isopropylamino, N-(lower alkyl)-N-phenylamino and N-(lower alkyl)-N-(p-tolyl)amino.

2. An axial isomer of a compound of claim 1.

3. 2-acyloxy - 3-(N,N-diethylcarboxamido) - 9,10-di (lower alkoxy) - 1,2,3,4,6,7-hexahydro - 11b-H-benzopyridocoline wherein the acyl moiety is alkanoyl having from two to seven carbon atoms.

4. 2-acetoxy - 3 - (N,N-diethylcarboxamido)-9,10-dimethoxy-1,2,3,4,6,7-hexahydro - 11b - H-benzopyridocoline wherein the acetoxy group is axial.

5. 2-benzoyloxy - 3 - (N,N-diethylcarboxamido)-9,10-dimethoxy-1,2,3,4,6,7-hexahydro - 11b - H-benzopyridocoline wherein the benzoyloxy group is axial.

6. 2-(N-monosubstituted carbamyloxy) - 3 - (N,N-diethylcarboxamido) - 9,10-di(lower alkoxy) - 1,2,3,4,6,7-hexahydro-11b-H-benzopyridocoline wherein the substituted group is lower alkyl.

7. 2-(N-monoethylcarbamyloxy) - 3 - (N,N-diethylcarboxamido) - 9,10 - dimethoxy-1,2,3,4,6,7-hexahydro-11b - H - benzopyridocoline wherein the N-monoethylcarbamyloxy group is axial.

8. 2-alkoxycarboxy - 3 - (N,N-diethylcarboxamido)-9,10-di(lower alkoxy)-1,2,3,4,6,7-hexahydro - 11b-H-benzopyridocoline wherein the alkoxy moiety has from one to eight carbon atoms.

9. 2-ethoxycarboxy - 3 - (N,N-diethylcarboxamido)-9,10-dimethoxy - 1,2,3,4,6,7-hexahydro - 11b - H-benzopyridocoline wherein the ethoxycarboxy group is axial.

10. 2-trifluoroacetoxy - 3 - (N,N-diethylcarboxamido)-9,10-dimethoxy - 1,2,3,4,6,7-hexahydro - 11b - H-benzopyridocoline wherein the trifluoroacetoxy group is axial.

11. An epimeric mixture of the axial and equatorial isomers of a compound of claim 1.

No references cited.